Jan. 27, 1959 E. C. FOX, JR., ET AL 2,871,430
MOTOR CONTROL SYSTEM
Filed Aug. 20, 1954
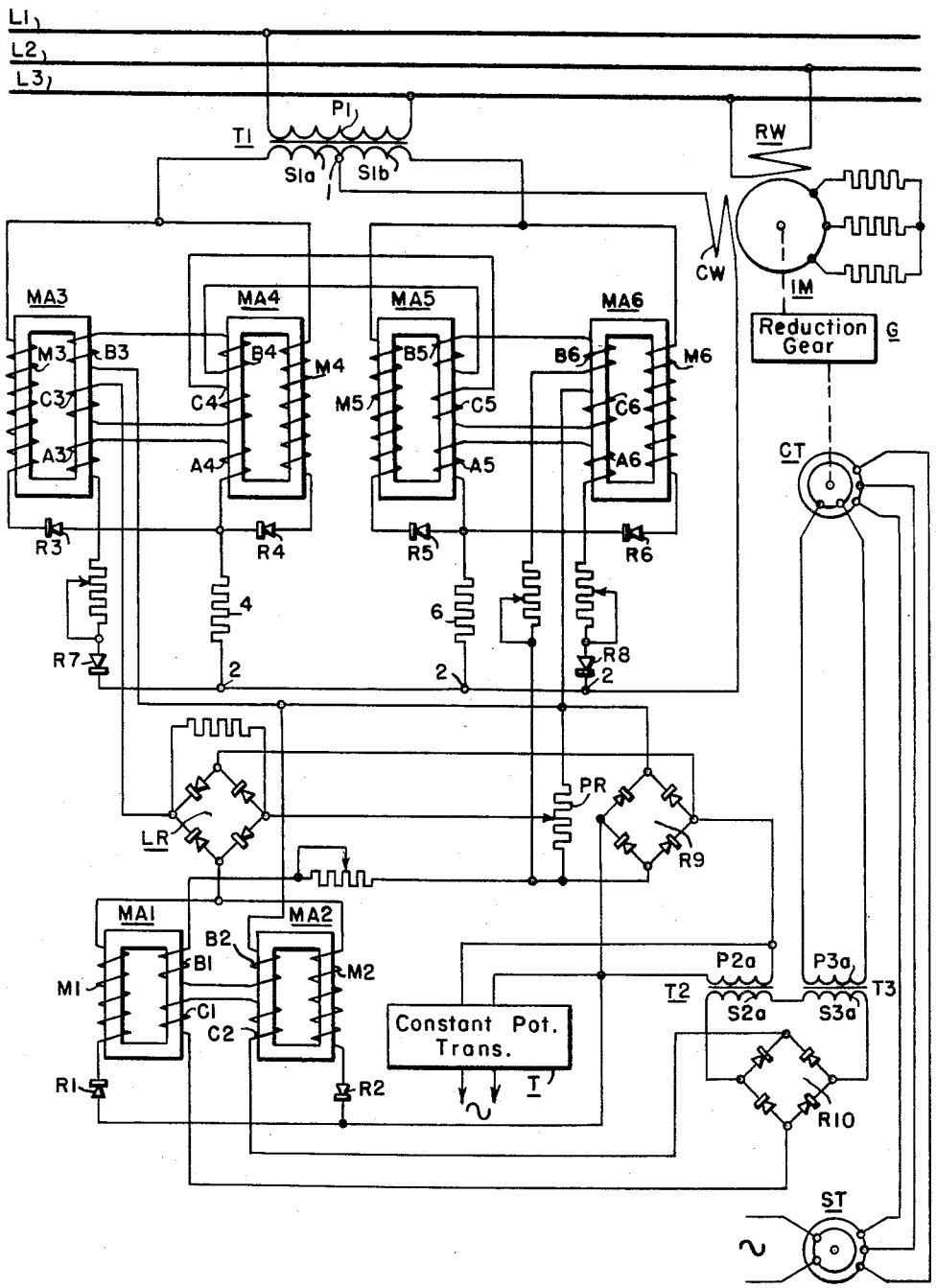
WITNESSES:
E. A. McCloskey.
E. F. Oberheim
INVENTORS
Edgar C. Fox, Jr.,
Charles G. Helmick, Jr.
and Sylvester J. Campbell.
BY
Paul E. Friedemann
ATTORNEY

United States Patent Office 2,871,430
Patented Jan. 27, 1959

2,871,430

MOTOR CONTROL SYSTEM

Edgar C. Fox, Jr., Wilkinsburg, Charles G. Helmick, Jr., Penn Township, Allegheny County, and Sylvester J. Campbell, North Braddock, Pa., assignors to Westinghouse Electric Corporation, East Pittsburgh, Pa., a corporation of Pennsylvania Application August 20, 1954, Serial No. 451,186

11 Claims. (Cl. 318—30)

This invention relates generally to the control of alternating-current motors and more in particular to systems for reversibly controlling multi-phase alternating-current motors.

The invention is herein illustrated in connection with a two-phase alternating-current induction motor, however, the control may be extended to three-phase systems by connecting one section of the three-phase primary winding to a supply of alternating-current voltage and serially connecting the remaining two sections of the primary winding to a supply of adjustable voltage, the phase of which is reversible with respect to that of said one primary winding section.

In modern position control systems, high accuracy of motor control is usually required. Three major types of motor controls are employed. These include vacuum tubes, gas tubes and dynamo-electric machines, the respective types being used as system amplifiers. Vacuum tube and gas tube arrangements are usually sufficiently accurate but are generally limited to fractional horsepower motors and are not sufficiently sturdy for many applications. When applied to larger horsepower drives, tube amplifiers become very costly and as a rule, their life expectancy drops. The dynamo-electric machine type of drive is usually fairly expensive and while of a durable nature, it presents a disturbing maintenance problem in many applications.

One object of this invention is to provide a motor control system which is simple with respect to operational requirements and positive in operation.

Another object of this invention is to provide a motor control system which is rugged and uses only substantially maintenance-free amplifier components.

A further object of this invention is to provide a follow-up type of position control system for controlling the angular position and direction of rotation of an alternating-current induction motor.

Yet another object hereof is to provide an induction motor control system which employs magnetic amplifiers for controlling the motor.

A specific object of this invention is to provide an arrangement for producing a reversible polarity variable magnitude direct-current voltage in dependence of phase reversals and magnitude changes of an alternating-current voltage.

The foregoing statements are merely illustrative of the various aims and objects of this invention. Other objects and advantages will become apparent upon a study of the following specification when considered in conjunction with the accompanying drawing, in which the single figure thereof diagrammatically illustrates a motor control system embodying the principles of this invention.

The present invention is directed to a motor positioning control in which the motor speed, direction of rotation and ultimate position is to be controlled in dependence of the movement of a piloting member which may be manually operated, or controlled automatically in accordance with some given pattern of operation. The system herein illustrated avoids many of the problems of direct-current variable voltage drives by using an alternating-current induction motor for controlling the element to be controlled. This motor is designated IM, and is a conventional two-phase motor having a resistance loaded secondary winding circuit which imparts a drooping characteristic to the motor torque to provide stability of the system over a wide range of operation.

This motor is equipped with a pair of field windings arranged to produce quadrature fluxes of an alternating nature, the instant phase relation of which determines the direction of rotation of the motor. One rotor winding is designated RW. It is connected for single-phase excitation to one phase of a three-phase supply of alternating current generally designated by conductors L1, L2 and L3. This winding functions as the reference winding. The second winding designated CW is the control winding and is excited with a variable magnitude reversible phase alternating-current voltage of the same frequency as that applied to the reference winding.

As noted in the opening statements of this specification, a motor such as IM may be a three-phase motor, in which case one primary winding section would be separated from the other two and connected to a supply of alternating current to function as the reference winding. The other two windings would be connected in series across a supply of reversible phase variable magnitude alternating current to function as the control winding. These and other expedients may be practiced with an induction motor to achieve the results herein considered in connection with the two-phase motor IM.

In controlling the induction motor IM from a remote point, a syncro-transmitter, generally designated ST, may be employed. This syncro-transmitter is energized with alternating current of any suitable frequency. The signal transmitted by this syncro-transmitter is applied to a control transformer equipped with a rotatable secondary winding which is driven in rotation through a reduction gear driven by the rotor of the induction motor IM. This arrangement is generally known in the trade as a syncro-tie system, in which the instant phase and magnitude of the induced voltage in secondary winding of the control transformer CT with respect to a particular reference alternating-current voltage depends upon the direction of rotation and the amount of rotation of the control transformer magnetic field from quadrature relation with the main induction axis of the control transformer secondary winding. This rotation of the field in the control transformer is accomplished by rotation of the rotor winding of the syncro-transmitter.

The output alternating-current voltage of the rotor winding of the control transformer is compared with a fixed alternating-current reference voltage derived from a constant potential transformer generally designated T, the primary winding of which (not shown) is connected to an alternating-current supply, the frequency of which is the same as that of the supply for the synchro-transmitter ST. In this arrangement, a primary winding P2a of a transformer generally designated T2 is connected across the output of the secondary of the constant potential transformer T. A primary winding P3a of a transformer T3 is connected to the rotor winding of the control transformer CT. The respective secondary windings S2a and S3a of transformers T2 and T3 are connected in series across the input terminals of a full-wave bridge type rectifier generally designated R10 which may be of any suitable type. The arrangement is such that the ampere turns of primary winding P3a are cumulative with respect to the ampere turns of primary winding P2a for one phase condition of the control transformer CT and are differential with respect to the ampere turns of primary winding P2a upon a reversal in phase of the output of the control transformer. The magnitude of the voltage across the primary winding P2a may be selected to be larger than the largest expected voltage across the primary winding P3a so that when the ampere turns of these two primary windings are in opposition, the voltage of the primary winding P2a will predominate in the secondary winding circuit. This secondary winding voltage is rectified and applied to respective control windings C1 and C2 of a doubler type magnetic amplifier arrangement involving respective parallel connected magnetic amplifiers MA1 and MA2.

Magnetic amplifiers MA1 and MA2 are provided with respective alternating-current energized main windings M1 and M2 which are supplied with alternating current by the output of the constant potential transformer. These main windings are polarized by means of respective self-saturating rectifiers R1 and R2 and are oppositely poled in parallel in a circuit including a load rectifier LR across the output of the constant potential transformer. The load rectifier LR is utilized to polarize, that is, produce full wave rectification, of the output of the parallel connected amplifiers MA1 and MA2 and this polarized output voltage is utilized to control a second stage magnetic amplifier arrangement of the bridge-connected type which is utilized to control the excitation of the motor control winding CW.

Magnetic amplifiers MA1 and MA2 are provided with respective bias windings B1 and B2 suitably energized from a supply of direct current represented in full-wave rectifier R9, the input of which is connected to the output of the constant potential transformers. In the absence of an error signal, in one mode of operation, the output of the control transformer CT will be zero and consequently the voltage appearing across the output terminals of rectifier R10 will be that due to the primary excitation of primary winding P2a. The magnetic flux appearing in the cores of respective magnetic amplifiers MA1 and MA2 when the error signal is zero is so arranged that these respective magnetic amplifiers are biased approximately to the midpoint of their operating characteristics and therefore produce a corresponding output voltage appearing as the direct-current voltage at the output terminal of the load rectifier LR.

In the instant application, it is desired to obtain a direct-current voltage from this single doubler magnetic amplifier circuit arrangement which reverses in polarity and magnitude in correspondence with phase reversals and magnitude of the alternating-current output voltage of the rotor winding of the control transformer to properly control the bridge-connected magnetic amplifiers to achieve phase reversals in the excitation of the motor control winding CW. In the instant case, this is accomplished by applying a direct-current voltage tapped from a potentiometer rheostat PR, energized by the direct-current supply R9, in opposition to the normal or zero error direct-current output of the magnetic amplifiers MA1 and MA2. By adjusting this voltage so that it is exactly in opposition to the named normal output voltage, it will be appreciated that increasing output voltage of the magnetic amplifiers MA1 and MA2 will result in a net direct-current voltage output of the circuit which corresponds to the polarity of the load rectifier LR. On the other hand, when the output of magnetic amplifiers MA1 and MA2 decreases, the net voltage in the output circuit will be of a polarity corresponding to that derived at the potentiometer rheostat PR. Since these direct voltages are in direct opposition, this output voltage of magnetic amplifiers MA1 and MA2 results in the reversal of polarity of the circuit output voltage.

The circuit for controlling the excitation of motor control winding CW includes respective pairs of parallel connected doubler type magnetic amplifiers in which the respective pairs comprise magnetic amplifiers MA3, MA4 and MA5, MA6. These amplifiers are provided with respective main windings M3, M4, M5 and M6, each having its series connected self-saturating rectifiers R3, R4, R5 and R6. The respective pairs of main windings and associated self-saturating rectifiers are connected in oppositely poled parallel relationship in adjacent legs of an electrical bridge circuit, the remaining two adjacent legs of which are comprised of the tapped sections S1a and S1b of the secondary winding of a transformer T1. The primary winding P1 of transformer T1 is connected across a phase of the alternating-current supply circuits L1, L2 and L3, which is different from that phase to which motor winding RW is connected.

The output terminals of this bridge circuit are represented in the tap 1 of the secondary winding of transformer T1 and the common terminals 2 at the other side of the magnetic amplifier main winding circuits. The motor control winding CW is connected between these output terminals.

In such an alternating bridge circuit, it is possible to achieve reversals in phase of the bridge output voltage with respect to the bridge input voltage by unbalancing the bridge circuit in one direction or the reverse. By this expedient, reversals in phase of excitation of motor control winding CW with respect to the reference winding RW are achieved.

The respective magnetic amplifiers are provided with bias windings B3, B4, B5 and B6. This group of bias windings is connected in series with a suitable calibrating resistance across the direct-current supply R9, and the ampere turns of these windings are opposed to the ampere turns of the main winding and are such as to bias the respective amplifiers into their minimum output range. Each magnetic amplifier is also provided with a control winding. These windings are respectively designated C3, C4, C5 and C6 and are also connected in series. Their source of excitation however is the net direct-current voltage in the circuit including the load rectifiers LR and the tapped portion of the potentiometer rheostat PR and these control windings are poled in such relation with respect to the bias winding, that for one polarity of direct-current output voltage in the load rectifier loop the magnetic amplifiers MA3 and MA4 will be biased to conduct while the magnetic amplifiers MA5 and MA6 will remain in their minimum output range. For a reverse direct voltage in the load rectifier loop, control windings C5 and C6 effectively bias the magnetic amplifiers MA5 and MA6 into their conducting range while control windings C3 and C4 maintain magnetic amplifiers MA3 and MA4 in their minimum output range.

By this means, therefore, the impedances of the adjacent legs of the bridge circuit constituted by the respective pairs of magnetic amplifiers MA3, MA4, and MA5, MA6 are varied, unbalancing the bridge circuit in one sense or the reverse. Since one magnetic amplifier of each pair when biased into its conducting range becomes conducting on the respective half cycle of alternating-current voltage, it will be appreciated that an alternating-current voltage of one phase or the reverse with respect to the bridge excitation voltage appears across the control winding CW for the motor IM and the magnitude of this voltage is a function of the differential between the voltage tapped at potentiometer rheostat PR and the load rectifier voltage, which, due to the control of magnetic amplifiers MA1 and MA2, corresponds to the direction and magnitude of error in motor position with respect to the position of the rotor winding of the syncro-transmitter ST.

The system may be stabilized in any suitable manner conventional in magnetic amplifier control. One method herein illustrated involves respective anti-hunt windings A3, A4, A5 and A6, which are connected in respective pairs with respective resistors 4 and 6 which carry the output currents of the respective magnetic amplifiers. To prevent improper control of the magnetic amplifiers by these anti-hunt windings, the respective series connected pairs are polarized by means of rectifiers R7 and R8 in the excitation loop so that the anti-hunt voltage can be applied at any time during the conducting periods of the respective pairs of magnetic amplifiers.

With the arrangement described, assuming that zero error exists, if for any reason the motor is driven from this zero error position by action of its connected load or if a new position of the motor is commanded by rotation of the syncro-transmitter ST, a voltage of corresponding phase and of magnitude corresponding to the magnitude of the error is produced in the rotor winding of the control transformer. This voltage, by reason of its comparison in the secondary windings of transformers T2 and T3 with the reference alternating-current voltage, results in the production of a direct-current voltage, the value of which will increase or decrease from that corresponding to zero error depending upon the instant phase relation of the alternating currents in the respective primary windings of transformers T2 and T3. The change in output of magnetic amplifiers MA1 and MA2 results in a differential voltage in the circuit of load rectifier LR which controls the bridge type magnetic amplifier circuit to produce bridge unbalance of one sense or the reverse to thereby excite the control winding CW of the induction motor in such sense as to cause motor rotation in a direction to minimize the error. As will be seen, the system functions effectively as a closed loop regulator.

While but one embodiment of this invention has been illustrated herein, it will be appreciated that numerous changes may be made in the invention both in its details and in the organization of such detail without departing from the spirit and scope thereof. Accordingly, it is intended that the foregoing discussion and the drawing shall be considered only as illustrative of the principles of the invention and not construed in a limiting sense.

We claim as our invention:

1. A position regulator for positioning a member to be controlled comprising, a control transformer having a stationary winding and a rotatable winding, means for connecting said rotatable winding to be rotated by movement of said member, means for applying alternating current to one of said windings, means for producing a reference alternating-current voltage, transformer means connected to algebraically combine the voltage of the other of said windings of said control transformer and said reference voltage, said transformer having an output circuit, a rectifier connected in said output circuit, amplifier means controlled by said rectifier and having a direct-current output circuit, means connected with said direct-current output circuit for controlling said member, and means connected with said direct-current output circuit for applying a direct-current voltage therein in opposition to the direct-current voltage output of said amplifier means.

2. A position regulator for positioning a member to be controlled comprising, a control transformer having an alternating-current input circuit and a rotatable single-phase output circuit, means for rotating said single-phase output circuit in dependence of movement of said member, means for applying alternating current to said input circuit, a transformer having primary circuit means and a secondary circuit, means for applying a reference alternating-current voltage to said primary circuit means, means for applying the electrical output of said single-phase output circuit to said primary circuit means, said transformer algebraically combining the primary circuit voltage in said secondary circuit, amplifier means having a direct-current output circuit and having an input circuit, rectifier means connecting said secondary circuit to said input circuit of said amplifier means, means connected with said direct-current output circuit of said amplifier means for controlling said member, and means for applying a direct-current voltage in said direct-current output circuit of said amplifier means in opposition to the direct-current output voltage of said amplifier means.

3. A circuit for producing a direct-current voltage which reverses in polarity in dependence of a reversal in phase of an alternating-current voltage comprising, means for producing an alternating-current voltage of reversible phase, means for producing an alternating-current reference voltage of the same frequency as said reversible phase alternating-current voltage, transformer means for algebraically combining said alternating-current voltages, rectifier means connected with said transformer means for rectifying the output thereof, an amplifier having an input circuit connected to said rectifier and having a direct-current output circuit, and means for applying a direct-current voltage in said output circuit of said amplifier in opposition to the output voltage of said amplifier.

4. A circuit for producing a reversible direct-current voltage with reversals in phase of an alternating-current voltage comprising, means for producing an alternating-current voltage of reversible phase and varying magnitude, means for producing a reference alternating-current voltage of greater magnitude than any attainable magnitude of said first named alternating-current voltage, circuit means for algebraically combining said alternating-current voltages and producing a direct-current control voltage having a magnitude proportional to the algebraic sum of said voltages, an amplifier having an input circuit and a direct-current output circuit, and normally producing an electrical output of direct-current voltage of given value, circuit means connected with said direct-current output voltage of said amplifier for applying a direct-current voltage thereto of a magnitude corresponding to said given value of normal output voltage of said amplifier and in opposition thereto, and circuit means applying said direct-current control voltage to said input circuit of said amplifier.

5. A circuit for producing a direct-current voltage which varies in polarity and magnitude with reversals in phase and magnitude of an alternating-current voltage comprising, an amplifier having a direct-current output circuit and an input circuit and having a normal direct-current output of a given magnitude, means for applying a direct-current voltage of said given magnitude but of opposite polarity to said output circuit, means for producing a reversible phase variable magnitude alternating-current voltage, means for producing a reference alternating-current voltage of the same frequency as said first-named alternating-current voltage, and circuit means having an output circuit connected to said input circuit of said amplifier and including a circuit portion for algebraically combining said alternating-current voltages.

6. An alternating-current motor control system comprising a multi-phase alternating-current motor having a resistance loaded rotor winding circuit, an alternating-current reference field winding circuit and an alternating-current control field winding, an alternating-current electrical bridge circuit having output terminals connected to said control field winding, respective pairs of parallel connected oppositely poled direct-current amplifiers connected as adjacent legs in said bridge circuit, each amplifier having a direct-current input circuit, said input circuits being poled for one polarity of direct-current energization to produce alternate conduction of the amplifiers constituting one pair of said respective pairs of amplifiers on alternate half-cycles of bridge alternating-current voltage and for a reverse polarity of direct-current energization producing alternate conduction of the amplifiers constituting the other pair of said respective pairs of amplifiers on alternate half-cycles of bridge alternating-current voltage, a first stage amplifier having a direct-current control circuit and a direct-current output circuit, a biasing circuit controlling said first stage amplifier to produce a normal direct-current output voltage of given magnitude, said direct-current output circuit of said first stage amplifier being connected to energize said direct-current input circuits of said pairs of amplifiers, a direct-current source connected in said direct-current output circuit of said first stage amplifier in opposition to the output voltage of said first stage amplifier and being of a value substantially equal and opposite to said given value of said normal output voltage, and circuit means having a direct-current output circuit connected to energize said direct-current control circuit of said first stage amplifier and having a voltage adjusting movable member connected to be driven by said motor.

7. An alternating-current motor control system comprising a multi-phase alternating-current motor having a resistance loaded rotor winding circuit, an alternating-current reference field winding circuit and an alternating-current control field winding, an alternating-current electrical bridge circuit having output terminals connected to said control field winding, respective pairs of parallel connected oppositely poled direct-current amplifiers connected as adjacent legs in said bridge circuit, each amplifier having a direct-current input circuit, said input circuits being poled for one polarity of direct-current energization to produce alternate conduction of the amplifiers constituting one pair of said respective pairs of amplifiers on alternate half-cycles of bridge alternating-current voltage and for a reverse polarity of direct-current energization producing alternate conduction of the amplifiers constituting the other pair of said respective pairs of amplifiers on alternate half-cycles of bridge alternating-current voltage, a first stage amplifier having a direct-current control circuit and a direct-current output circuit, a biasing circuit controlling said first stage amplifier to produce a normal direct-current output voltage of given magnitude, said direct-current output circuit of said first stage amplifier being connected to energize said direct-current input circuits of said pairs of amplifiers, a direct-current source connected in said direct-current output circuit of said first stage amplifier in opposition to the output voltage of said first stage amplifier and being of a value substantially equal and opposite to said given value of said normal output voltage, an alternating-current syncro-transmitter having a movable element for adjusting the phase and magnitude of transmitter output voltage in dependence of movement of said movable element from a given position, a control transformer energized by the output voltage of said transmitter and having a movable element for adjusting the phase and magnitude of transformer output voltage in depedence of movement of the movable element therefor, means connecting said movable element of said control transformer to be driven by said motor, means for producing an alternating-current reference voltage, circuit means including a transformer for algebraically combining said alternating-current reference voltage and the output voltage of said control transformer, and rectifier means connected to receive the output voltage of said transformer and applying a direct-current voltage to said direct-current control circuit of said first stage amplifier.

8. A remote positioning control system comprising, a two-phase alternating-current motor having an alternating-current reference winding circuit and a control winding, an alternating-current bridge circuit having output terminals connected to energize said control winding, direct-current controlled impedance devices connected as adjacent legs of said bridge and having opposite impedance variations for a given polarity of direct-current control, an alternating-current phase reversing circuit having a pair of adjustable phase reversing elements, means connecting one of said elements to be driven by said motor, a source of alternating-current reference voltage, circuit means algebraically combining the alternating-current output voltage of said phase reversing circuit with said alternating-current reference voltage and having a direct-current output circuit, means for applying a given value of direct-current voltage in said direct-current output circuit in opposition to the direct-current output voltage of said direct-current output circuit, and circuit means connecting said direct-current output circuit to control said impedance devices in opposite senses.

9. A motor control system comprising, a multiphase induction motor having a rotor winding and a pair of field windings including an alternating-current reference field winding and a control field winding, resistance means connected with said rotor winding to impart a drooping characteristic to the speed-torque characteristic; an alternating-current bridge circuit connected to energize said control field winding, respective pairs of parallel connected oppositely poled magnetic amplifiers connected as adjacent legs in said bridge circuit, biasing winding means on each magnetic amplifier for biasing each magnetic amplifier substantially to minimum output, control winding means on each magnetic amplifier, a supply of reversible direct current connected to each control winding means, said respective control winding means being poled to effect conduction of one pair of magnetic amplifiers for one polarity of said reversible direct current and effecting conduction of the remaining pair of magnetic amplifiers for the other polarity of said direct current, said supply of reversible direct current comprising a magnetic amplifier having a direct-current output circuit connected to said control winding means, and a direct-current control winding circuit, a biasing winding circuit biasing said last-named magnetic amplifier to substantially the midpoint of its output characteristic to produce a given direct-current output voltage, and means connected with said direct-current output circuit for applying a direct-current voltage in said output circuit in opposition to and equal to said given direct-current voltage.

10. A position regulator for positioning a member to be controlled comprising, means responsive to said member for producing an alternating-current error voltage which reverses in phase with the direction of displacement of said member from a reference position, means for producing an alternating-current reference voltage of greater magnitude than any magnitude attained by said error voltage, means for producing a direct-current reference voltage, control means for producing a rectified algebraic sum of said alternating-current reference and error voltages, and amplifier means responsive to a comparison of said rectified algebraic sum and said direct-current reference voltage for controlling said member.

11. A position regulator for positioning a member to be controlled comprising, means for producing an alternating-current reference voltage, means responsive to movement of said member for producing an alternating-current error voltage which reverses in phase with respect to said reference voltage depending upon the direction of displacement of said member from a reference position and is always less than said reference voltage, means for algebraically combining said voltages and including a rectifier having an output circuit, a direct-current reference voltage, two stage amplifier means having a first stage input circuit connected to said rectifier output circuit and responsive to the electrical output of said rectifier and said direct-current reference voltage, said first stage having a direct-current output circuit connected to the second stage input and controlling the second stage output, the output of said second stage controlling said member, and means for applying a direct-current voltage to the output circuit of said first stage in opposition to the direct-current voltage output of said first stage and of lesser magnitude than the greatest output voltage of said first stage.

References Cited in the file of this patent

UNITED STATES PATENTS

| | | |
|---|---|---|
| 2,477,729 | Fitz-Gerald | Aug. 2, 1949 |
| 2,677,796 | Geyger | May 4, 1954 |
| 2,703,380 | Fraser | Mar. 1, 1955 |

OTHER REFERENCES

"Magnetic Amplifier Fundamentals," pp. 28 and 31, Buships Electron, June 1951.

"Magnetic Amplifiers," publ. of Vickers Electric Division, 1948, page 28.

"An Improved Magnetic Servo Amplifier," Lufcy et al., AIEE Transaction, vol. 71, part I, September 1952, pp. 281 and 282.